E. S. COBB.
FRUIT CLIPPER.
APPLICATION FILED MAY 21, 1918.
1,287,637.
Patented Dec. 17, 1918.
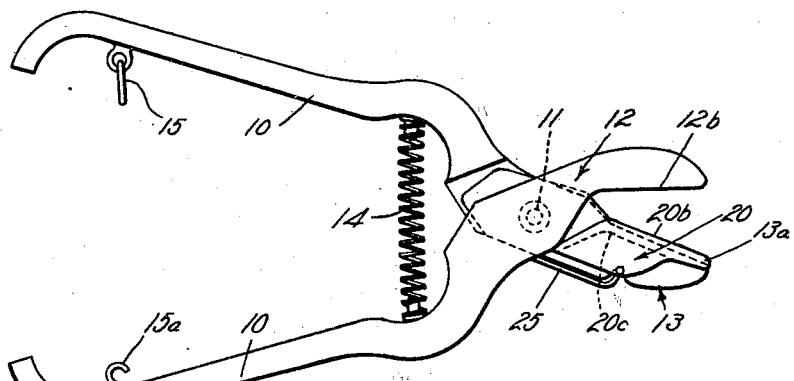
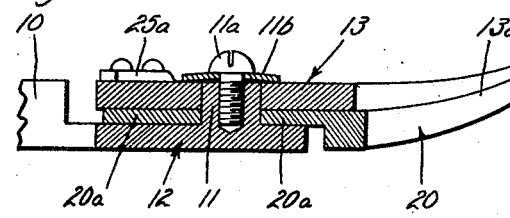
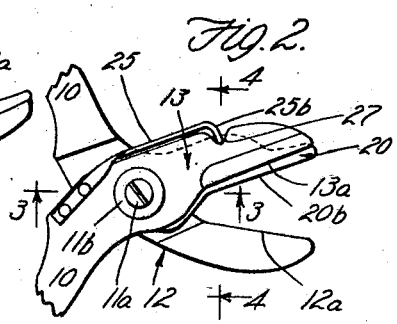
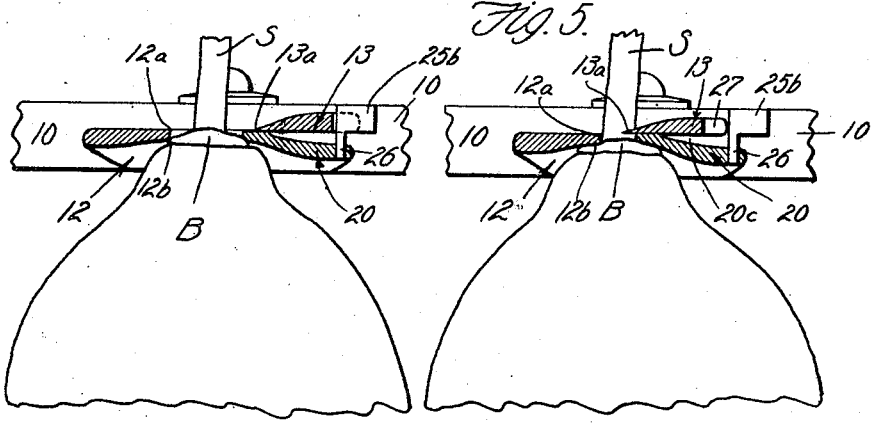
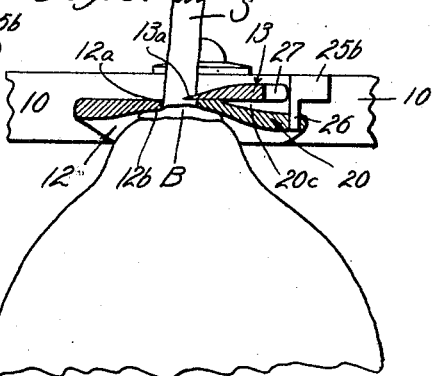
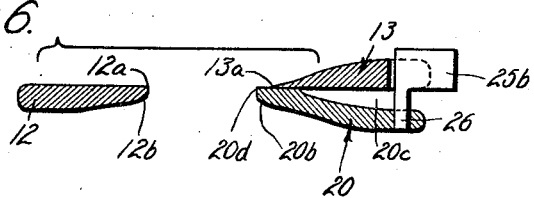
Inventor
Edward S. Cobb
by
his Attorney

UNITED STATES PATENT OFFICE.

EDWARD S. COBB, OF WHITTIER, CALIFORNIA, ASSIGNOR OF ONE-THIRD TO JOHN H. BATCHER, OF SAN FRANCISCO, CALIFORNIA.

FRUIT-CLIPPER.

1,287,637.  Specification of Letters Patent.  Patented Dec. 17, 1918.

Application filed May 21, 1918. Serial No. 235,864.

*To all whom it may concern:*

Be it known that I, EDWARD S. COBB, a citizen of the United States, residing at Whittier, in the county of Los Angeles, State of California, have invented new and useful Improvements in Fruit-Clippers, of which the following is a specification.

This invention relates to clippers or shears for clipping fruit from trees; and it relates more particularly to clippers adapted for use in clipping citrus fruit and the like, where it is desirable to cut as closely as possible to the stem button and yet not to injure the fruit or the button in any manner. Injury to the fruit or the button makes the fruit entirely unsuitable for shipping purposes. It is also an object to provide a clipper of convenient and handy form, easily operated, and requiring no particular carefulness of operation to avoid injuring the fruit. In fact, my clipper is so made as to render it virtually impossible to injure the fruit if the clipper is used in any reasonable manner.

The general features, objects and accomplishments of the invention, and the invention itself, will be best understood from the following detailed description of a preferred form of clipper which embodies the invention; reference for this purpose being had to the accompanying drawings in which—

Figure 1 is a bottom plan view of the clipper; Fig 2 is a top plan view of the jaw portions of the clipper; Fig. 3 is an enlarged section taken on line 3—3 of Fig. 2; Fig. 4 is an enlarged cross section taken on line 4—4 of Fig. 2 and showing the clipper applied to a fruit; Fig. 5 is a similar section showing the clipping action in process; and Fig. 6 is an enlarged section similar to Fig. 4, showing the sections of the blades.

In the drawings I show what may be a preferred general form and general arrangement of the clipper but excepting the curvature of the blades and jaws, which may be more or less depending on the kind of service required. For instance, the curvature is slight for lemons (about what is shown in the drawings) and is much greater for oranges, etc. I utilize the usual clipper mechanism to some extent, embodying a pair of handles 10 pivoted on a stud 11 which is preferably formed integrally with the lower jaw member 12, a screw and washer $11^a$ and $11^b$ being used to hold the upper jaw member 13 on the pivot. An expansion spring 14 of the usual kind is used, also a means at 15, $15^a$ for holding the handles in their closed position. In the parts of the clipper thus generally described the construction is or may be in accordance with ordinary clippers. Now the difficulty with ordinary clippers is this: that great care must be used in placing the clipper jaws upon the fruit to avoid cutting or mutilating the button B or the fruit itself when the clipper is operated to cut the stem S. One or both of the opposite edges of the jaws are sharp and the button or fruit can be very easily mutilated or cut if the operator does not exercise constant care. And the liability of thus mutilating the button is much increased by the fact that the stem should be cut as closely to the button as possible without in any way abrading the latter.

Now, according to my invention, I make the lower jaw 12 with a cutting edge corner $12^a$, edge corner $12^b$ being rounded away; so that, in fact, this jaw presents a protected cutting edge (the edge $12^a$), and is an edge against which the sharp edge $13^a$ of the upper jaw 13 will shear the stem. The upper jaw 13 does the effective cutting; the lower jaw 12 acts as an abutment to resist the thrust of the cutter edge $13^a$; and the handle of the jaw 12, may be regarded in practice as being stationary, while the upper jaw 13 and its handle are the movable parts which do the actual cutting of the stem.

Below the upper jaw 13, and situated opposite to lower jaw 12, I employ a guard jaw 20, which is also pivoted upon the pivot stud 11, having a flat plate extension $20^a$ mounted upon pivot 11 and lying between the two jaws 12 and 13. This guard jaw 20 is substantially similar in cross section to lower jaw 12 (see Figs. 4, 5 and 6) so that the lower surfaces of the jaws 12 and 20 are in substantially the same horizontal plane, so as to rest and bear equally, and support the clipper squarely and horizontally, upon the button of the fruit. The forward upper edge corner $20^d$ of this guard jaw 20 is square, same as edge $12^a$ of lower jaw 12, and the lower forward corner $20^b$ is rounded same as $12^b$ on jaw 12, the upper jaw 13 and guard jaw 20 fit against each other; and in order to reduce friction, and to prevent the fruit juices gumming up the bearing surface between the two jaws, I cut away the back part of the guard jaw 20 as shown at 20°. Normally, the guard jaw rests in such a position that its forward edge 20ᵈ is somewhat in advance of cutting edge 13ᵃ of upper cutting jaw 13 (see Figs. 4 and 6). It is held in this forward position, and this position is limited, by means of a spring construction embodying a spring 25, preferably flat and extending along the back edge of jaw 13, being turned up at 25ᵃ and secured to this upper jaw. At its forward end this spring is turned inwardly at 25ᵇ and then it has a depending portion—a lug or pin—as shown at 26, which passes into an aperture in the back part of guard jaw 20. Where the spring turns inwardly at its forward end, at 25ᵇ, there is a notch 27 in the back edge of upper jaw 13; and the striking of the spring in the bottom of this notch limits the forward spring pressed movement of the guard jaw 20.

When the device is applied to a fruit, its jaws 12 and 20 are laid, in open position, upon the button B of the fruit, as is indicated in Fig. 4. The jaws are then closed by closing the handles in the usual manner of manipulation of such instruments. The two jaws 12 and 20 having rounded lower edges and smooth lower surfaces slide inwardly and upwardly over the surface of the button until they come into contact with stem S. As soon as the jaws come into contact with stem S, then the guard jaw 20 is held by the stem of the fruit from further inward movement and the upper cutting jaw 13 begins to move inwardly over the guard jaw. It will be seen that, up to the time when the two jaws 12 and 13 are in actual contact with the stem, the upper cutting jaw 13 is entirely guarded by the guard jaw 20; so that cutting edge 13ᵃ cannot by any possibility come into contact with the fruit or its button or with the stem until the jaws 12 and 20 have moved to proper position in contact with the stem. Then further compression of the handles 10 will cause the inward cutting movement of upper cutting jaw 13 and cause that cutting jaw to move through the stem, the lower guard jaw 20 remaining in its position with its edge in contact with the stem as is illustrated in Fig. 5. The upper cutting jaw then moves on through the stem and cuts and shears the stem against the lower jaw edge 12ᵃ. The two jaws or blades 12 and 20 are made of such thickness at the edges in contact with the stem of the fruit as may be desired to determine the distance of the cut above the button. The parts are shown in exaggerated size in Figs. 4, 5 and 6; in actual practice the cutting edge 13ᵃ of the upper cutting jaw cuts very close to the top of the button. When the cut is complete and compression of the main spring 14 is released the jaws move back to their normal positions, and as soon as the jaws are partially open the pressure of the stem against the guard jaw is released, then the guard jaw will move back to its normal position under the influence of spring 25.

Having described a preferred form of my invention, I claim:

1. A clipper comprising a pair of relatively movable jaws and means for moving said jaws, one of said jaws having a smooth rounded edge and the other having a sharp cutting edge, and a guard jaw mounted beneath the jaw with the sharp edge and resiliently supported with reference to the cutting jaw in a position with its edge in advance of the cutting edge of said jaw; said lower jaw and said guard jaw being in a common plane and having lower surfaces which slope upwardly toward their inner opposing rounded edges, as and for the purposes set forth.

2. A clipper comprising a pair of pivoted jaws and handles for operating the same, said jaws being in shearing relation to each other and one in a plane below the other, the lower jaw having a smooth rounded edge and the upper jaw having a sharp cutting edge, a guard jaw with a smooth rounded edge similar to the edge of the lower jaw arranged beneath the upper cutting jaw, and resilient means to support the guard jaw with its edge in advance of the cutting edge of the upper jaw; said lower jaw and said guard jaw being in a common plane and having lower surfaces which slope upwardly toward their inner opposing rounded edges, as and for the purposes set forth.

3. A clipper comprising a pair of pivoted jaws and handles for operating the same, said jaws being in shearing relation to each other and one in a plane below the other, the lower jaw having a smooth rounded edge and the upper jaw having a sharp cutting edge, a guard jaw with a smooth rounded edge similar to the edge of the lower jaw arranged beneath the upper cutting jaw, and resilient means to support the guard jaw with its edge in advance of the cutting edge of the upper jaw, said guard jaw being pivoted at the pivot of the two other jaws, and said resilient means embodying a spring pressing against the guard jaw and mounted upon the upper cutting jaw.

4. In a device of the character described having clipper jaws and having a guard jaw movable and spring supported upon one of the clipper jaws, a cut-away portion in the guard jaw back of its forward edge to relieve contact of the guard jaw with the other jaw.

5. A fruit clipper embodying the combination of two pivoted jaws and handles for operating them, said jaws being in shearing relation one in a plane above the other, the lower jaw having a smooth rounded edge and the upper jaw having a sharp cutting edge; a guard jaw pivoted at the pivotal point of the two clipper jaws and lying beneath the upper cutting jaw and in the same horizontal plane with the lower clipper jaw, a spring mounted upon the upper cutting jaw and having its end connected with the guard jaw to normally press the guard jaw forwardly with its edge forward of the cutting edge of the upper cutting jaw, the spring engaging the upper cutting jaw to form a limiting stop to the forward independent movement of the guard jaw with reference to the cutting jaw.

6. A fruit clipper embodying the combination of two pivoted jaws and handles for operating them, said jaws being in shearing relation one in a plane above the other, the lower jaw having a smooth rounded edge and the upper jaw having a sharp cutting edge; a guard jaw pivoted at the pivotal point of the two clipper jaws and lying beneath the upper cutting jaw and in the same horizontal plane with the lower clipper jaw, a spring mounted upon the upper cutting jaw and having its end connected with the guard jaw to normally press the guard jaw forwardly with its edge forward of the cutting edge of the upper cutting jaw, the spring engaging the upper cutting jaw to form a limiting stop to the forward independent movement of the guard jaw with reference to the cutting jaw, and the upper face of the guard jaw being cut away behind its forward edge, so as to allow the guard jaw to contact with the upper jaw only along its forward edge.

In witness that I claim the foregoing I have hereunto subscribed my name this 3d day of May, 1918.

EDWARD S. COBB.

Witness:
VIRGINIA I. BERINGER.

Copies of this patent may be obtained for five cents each, by addressing the "Commissioner of Patents, Washington, D. C."